United States Patent
Amireddy et al.

(10) Patent No.: US 9,604,651 B1
(45) Date of Patent: Mar. 28, 2017

(54) VEHICLE TELEMATICS UNIT COMMUNICATION AUTHORIZATION AND AUTHENTICATION AND COMMUNICATION SERVICE PROVISIONING

(71) Applicant: Sprint Communications Company L.P., Overland Park, KS (US)

(72) Inventors: Sridhar Reddy Amireddy, Overland Park, KS (US); David A. Haugh, Olathe, KS (US); Alex J. Oyler, Kansas City, MO (US); Joshua D. Turner, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 24 days.

(21) Appl. No.: 14/819,425

(22) Filed: Aug. 5, 2015

(51) Int. Cl.
| | |
|---|---|
| *B60W 50/08* | (2012.01) |
| *H04W 4/12* | (2009.01) |
| *H04W 12/04* | (2009.01) |
| *H04W 12/06* | (2009.01) |
| *H04L 12/40* | (2006.01) |

(52) U.S. Cl.
CPC .............. *B60W 50/08* (2013.01); *H04W 4/12* (2013.01); *H04W 12/04* (2013.01); *H04W 12/06* (2013.01); *H04L 2012/40215* (2013.01); *H04L 2012/40273* (2013.01)

(58) Field of Classification Search
CPC ....... B60W 50/08; H04W 4/12; H04W 12/04; H04W 12/06; H04L 2012/40215; H04L 2012/40273
See application file for complete search history.

(56) References Cited

U.S. PATENT DOCUMENTS

| | | |
|---|---|---|
| 5,892,900 A | 4/1999 | Ginter et al. |
| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |

(Continued)

FOREIGN PATENT DOCUMENTS

| | | |
|---|---|---|
| DE | 102011112540 A1 | 4/2012 |
| JP | 20062441 A | 9/2006 |

(Continued)

OTHER PUBLICATIONS

Service Platform for the Connected Traveler, Sep. 9, 2008, Seventh Fromwork Programme, vol. 1, 28, 43, 71, 87.

(Continued)

*Primary Examiner* — Khoi Tran
*Assistant Examiner* — Robert Nguyen

(57) ABSTRACT

A computer system comprising a processor, a non-transitory memory, and an application stored in the non-transitory memory. When executed by the processor, the application determines that a telematics unit (TU) has connected to a messaging gateway, determines communication services to which the TU is entitled, generates metadata based on the communication services to which the TU is entitled, where the metadata comprises instructions to the TU to subscribe to topics supported by a publish-subscribe messaging gateway, and transmits the metadata to the TU.

7 Claims, 5 Drawing Sheets

(56) References Cited

U.S. PATENT DOCUMENTS

| | | |
|---|---|---|
| 7,912,224 B2 | 3/2011 | Lee et al. |
| 7,949,375 B2 | 5/2011 | Kortge |
| 7,966,111 B2 | 6/2011 | Moinzadeh et al. |
| 8,271,050 B2 | 9/2012 | Weiss |
| 8,417,823 B2 | 4/2013 | Luna et al. |
| 8,457,686 B2 | 6/2013 | Przybylski |
| 8,484,707 B1 | 7/2013 | Bertz et al. |
| 8,527,164 B2 | 9/2013 | Staudinger et al. |
| 8,548,532 B1 | 10/2013 | Ng |
| 8,606,335 B2 | 12/2013 | Ozaki |
| 8,626,152 B2 | 1/2014 | Farrell et al. |
| 8,630,747 B2 | 1/2014 | Burcham et al. |
| 8,676,199 B2 | 3/2014 | Madhavan et al. |
| 8,750,942 B1 | 6/2014 | Ng |
| 8,787,949 B2 | 7/2014 | Sumcad et al. |
| 8,918,244 B2 | 12/2014 | Brzezinski et al. |
| 8,994,591 B2 | 3/2015 | Dupray et al. |
| 9,002,574 B2 | 4/2015 | Garrett et al. |
| 9,031,498 B1 | 5/2015 | Bertz et al. |
| 9,032,547 B1 | 5/2015 | Hohler et al. |
| 9,110,774 B1 | 8/2015 | Bonn et al. |
| 9,173,238 B1 | 10/2015 | Bloomcamp et al. |
| 9,252,951 B1 | 2/2016 | Katzer et al. |
| 9,398,454 B1 | 7/2016 | Burcham et al. |
| 9,439,240 B1 | 9/2016 | Shipley et al. |
| 9,444,892 B1 | 9/2016 | Amireddy et al. |
| 2001/0042107 A1 | 11/2001 | Palm |
| 2003/0066884 A1 | 4/2003 | Reddy et al. |
| 2003/0096641 A1 | 5/2003 | Odinak |
| 2003/0120601 A1 | 6/2003 | Ouye et al. |
| 2003/0224840 A1 | 12/2003 | Frank et al. |
| 2004/0044585 A1 | 3/2004 | Franco |
| 2004/0083041 A1 | 4/2004 | Skeen et al. |
| 2004/0125957 A1 | 7/2004 | Rauber et al. |
| 2004/0157650 A1 | 8/2004 | Wissinger et al. |
| 2005/0021744 A1 | 1/2005 | Haitsuka et al. |
| 2005/0027438 A1* | 2/2005 | Rockett ............... G08G 1/205 701/532 |
| 2005/0065779 A1 | 3/2005 | Odinak |
| 2005/0113102 A1 | 5/2005 | Kwon et al. |
| 2006/0059480 A1 | 3/2006 | Kimoto |
| 2006/0087971 A1 | 4/2006 | Kim et al. |
| 2006/0143463 A1 | 6/2006 | Ikeda et al. |
| 2006/0154659 A1 | 7/2006 | Roter et al. |
| 2006/0168578 A1 | 7/2006 | Vorlicek |
| 2007/0028220 A1 | 2/2007 | Miller et al. |
| 2007/0047466 A1 | 3/2007 | Todokoro |
| 2007/0086579 A1 | 4/2007 | Lorello et al. |
| 2007/0113269 A1 | 5/2007 | Zhang |
| 2007/0124043 A1 | 5/2007 | Ayoub et al. |
| 2007/0124045 A1 | 5/2007 | Ayoub et al. |
| 2007/0124046 A1 | 5/2007 | Ayoub et al. |
| 2007/0160199 A1 | 7/2007 | Sekiguchi et al. |
| 2007/0288423 A1 | 12/2007 | Kimoto |
| 2008/0021633 A1 | 1/2008 | Naito et al. |
| 2008/0034126 A1 | 2/2008 | Baker |
| 2008/0072047 A1 | 3/2008 | Sarikaya et al. |
| 2008/0148374 A1 | 6/2008 | Spaur et al. |
| 2008/0162676 A1 | 7/2008 | Magnusson |
| 2008/0289018 A1 | 11/2008 | Kawaguchi |
| 2008/0289044 A1 | 11/2008 | Choi |
| 2008/0307086 A1 | 12/2008 | Brooks et al. |
| 2009/0028082 A1 | 1/2009 | Wynn et al. |
| 2009/0049119 A1 | 2/2009 | Marcinkiewicz et al. |
| 2009/0109941 A1 | 4/2009 | Carter |
| 2009/0217036 A1 | 8/2009 | Irwin et al. |
| 2009/0265278 A1 | 10/2009 | Wang et al. |
| 2009/0287499 A1* | 11/2009 | Link, II ............... G06Q 30/018 705/317 |
| 2010/0054219 A1 | 3/2010 | Humblet et al. |
| 2010/0097239 A1 | 4/2010 | Campbell et al. |
| 2010/0136944 A1 | 6/2010 | Taylor et al. |
| 2010/0197362 A1 | 8/2010 | Saitoh et al. |
| 2010/0220250 A1 | 9/2010 | Vanderwall et al. |
| 2010/0234071 A1 | 9/2010 | Shabtay et al. |
| 2010/0235285 A1 | 9/2010 | Hoffberg |
| 2010/0245122 A1 | 9/2010 | Haralson et al. |
| 2010/0260350 A1 | 10/2010 | Chutorash et al. |
| 2010/0285787 A1 | 11/2010 | Matsuda |
| 2011/0009107 A1 | 1/2011 | Guba et al. |
| 2011/0086668 A1 | 4/2011 | Patel |
| 2011/0090908 A1 | 4/2011 | Jacobson et al. |
| 2011/0098044 A1 | 4/2011 | Aoyagi |
| 2011/0099316 A1 | 4/2011 | Tseng et al. |
| 2011/0111728 A1 | 5/2011 | Ferguson et al. |
| 2011/0252415 A1 | 10/2011 | Ricci |
| 2011/0257973 A1 | 10/2011 | Chutorash et al. |
| 2011/0263293 A1 | 10/2011 | Blake et al. |
| 2011/0295444 A1 | 12/2011 | Westra et al. |
| 2011/0310731 A1 | 12/2011 | Park et al. |
| 2012/0028597 A1 | 2/2012 | Chmielewski et al. |
| 2012/0028607 A1 | 2/2012 | Tengler et al. |
| 2012/0028656 A1 | 2/2012 | Yi et al. |
| 2012/0109406 A1 | 5/2012 | Yousefi et al. |
| 2012/0127139 A1 | 5/2012 | Hayami et al. |
| 2012/0134497 A1 | 5/2012 | Roitshtein et al. |
| 2012/0142367 A1 | 6/2012 | Przybylski |
| 2012/0159638 A1 | 6/2012 | McDade, Sr. |
| 2012/0167071 A1 | 6/2012 | Paek |
| 2012/0183221 A1 | 7/2012 | Alasry et al. |
| 2012/0203557 A1 | 8/2012 | Odinak |
| 2012/0282895 A1 | 11/2012 | Bai et al. |
| 2012/0324046 A1 | 12/2012 | Park |
| 2013/0082820 A1 | 4/2013 | Tieman |
| 2013/0205026 A1 | 8/2013 | Ricci |
| 2013/0218400 A1 | 8/2013 | Knoop et al. |
| 2013/0226391 A1 | 8/2013 | Nordbruch et al. |
| 2013/0297456 A1 | 11/2013 | Annan et al. |
| 2013/0304281 A1 | 11/2013 | Burcham et al. |
| 2014/0053261 A1 | 2/2014 | Gupta et al. |
| 2014/0068010 A1 | 3/2014 | Nicholson et al. |
| 2014/0087760 A1 | 3/2014 | Bennett |
| 2014/0128047 A1 | 5/2014 | Edwards et al. |
| 2014/0130036 A1 | 5/2014 | Gurikar et al. |
| 2014/0143354 A1 | 5/2014 | Tiernan |
| 2014/0222298 A1 | 8/2014 | Gurin |
| 2014/0222910 A1 | 8/2014 | Petersen et al. |
| 2014/0336919 A1 | 11/2014 | Li et al. |
| 2015/0288636 A1 | 10/2015 | Yalavarty et al. |
| 2016/0098870 A1* | 4/2016 | Bergerhoff ......... G07C 9/00007 340/5.61 |

FOREIGN PATENT DOCUMENTS

| | | |
|---|---|---|
| WO | WO2013166418 A2 | 11/2013 |
| WO | WO2013173331 A1 | 11/2013 |

OTHER PUBLICATIONS

Office Action dated Sep. 26, 2016, U.S. Appl. No. 13/463,799, filed May 3, 2012.
Office Action dated Oct. 4, 2016, U.S. Appl. No. 14/034,475, filed Sep. 23, 2013.
FAIPP Office Action dated Jul. 29, 2016, U.S. Appl. No. 14/530,667, filed Oct. 31, 2014.
Notice of Allowance dated Oct. 27, 2016, U.S. Appl. No. 14/530,667, filed Oct. 31, 2014.
First Action Interview Pre-Communication dated Sep. 9, 2016, U.S. Appl. No. 14/698,522, filed Apr. 28, 2015.
Notice of Allowance dated Apr. 28, 2016, U.S. Appl. No. 13/218,503, filed Aug. 26, 2011.
Advisory Action dated May 20, 2016, U.S. Appl. No. 13/463,799, filed May 3, 2012.
Advisory Action dated Jun. 1, 2016, U.S. Appl. No. 14/034,475, filed Sep. 23, 2013.
First Action Interview Pre-Communication dated Apr. 25, 2016, U.S. Appl. No. 14/530,667, filed Oct. 31, 2014.
Notice of Allowance dated May 16, 2016, U.S. Appl. No. 14/703,997, filed May 5, 2015.
Bloomcamp, Eric Michael, et al., Patent Application entitled "Dual Path In-Vehicle Communication," filed Feb. 15, 2013, U.S. Appl. No. 13/769,268.

(56) References Cited

OTHER PUBLICATIONS

Bloomcamp, Eric M., et al., Patent Application entitled "Authenticating Mobile Device for On Board Diagnostic System Access," filed Sep. 23, 2013, U.S. Appl. No. 14/034,475.
Finnerty, Brian J., et al., Patent Application entitled "Method for Authenticating Driver for Registration of In-Vehicle Telematics Unit," filed Oct. 31, 2014, U.S. Appl. No. 14/530,667.
Amireddy, Sridhar Reddy, et al., Patent Application entitled, "Vehicle Remote Operations Control," filed Apr. 28, 2015, U.S. Appl. No. 14/698,522.
Amireddy, Sridhar Reddy, et al., Patent Application entitled, "Network Event Management Support for Vehicle Wireless Communication," filed May 5, 2015, U.S. Appl. No. 14/703,997.
Restriction Requirement dated Jan. 29, 2016, U.S. Appl. No. 14/703,997, filed May 5, 2015.
Aboda, B., et al., "Exentsible Authentication Protocol (EAP)", Network Working Group, RFC 3748, Standards Track, Jun. 2004.
Foreign Communication From a Related Counterpart Application, International Search Report and Written Opinion dated Jun. 13, 2013, PCT/US13/40940 filed on May 14, 2013.
Foreign Communication From a Related Counterpart Application, International Preliminary Report on Patentability dated Nov. 27, 2014, PCT/US13/40940 filed on May 14, 2013.
Foreign Communication From a Related Counterpart Application, International Search Report and Written Opinion dated Dec. 23, 2013, PCT/US13/39514 filed on May 3, 2013.
Foreign Communication From a Related Counterpart Application, International Preliminary Report on Patentability dated Nov. 13, 2014, PCT/US13/39514 filed on May 3, 2013.
Belkin, Wireless Network Access Point User Manual, published by Belkin Corporation, 2003, pp. 1-36.
First Action Interview Pre-Communication dated Aug. 21, 2012, U.S. Appl. No. 13/218,503, filed Aug. 26, 2011.
First Action Interview Office Action dated Jan. 3, 2013, U.S. Appl. No. 13/218,503, filed Aug. 26, 2011.
Final Office Action dated May 7, 2013, U.S. Appl. No. 13/218,503, filed Aug. 26, 2011.
Advisory Action dated Aug. 1, 2013, U.S. Appl. No. 13/218,503, filed Aug. 26, 2011.
Dffice Action dated Feb. 5, 2014, U.S. Appl. No. 13/218,503, filed Aug. 26, 2011.
Final Office Action dated Jun. 16, 2014, U.S. Appl. No. 13/218,503, filed Aug. 26, 2011.
Advisory Action dated Sep. 26, 2014, U.S. Appl. No. 13/218,503, filed Aug. 26, 2011.
Office Action dated Jan. 13, 2016, U.S. Appl. No. 13/218,503, filed Aug. 26, 2011.
Restriction Requirement dated May 7, 2014, U.S. Appl. No. 13/094,494, filed Apr. 26, 2011.
Office Action dated Aug. 28, 2014, U.S. Appl. No. 13/094,494, filed Apr. 26, 2011.
Notice of Allowance dated Dec. 3, 2014, U.S. Appl. No. 13/094,494, filed Apr. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, Application U.S. Appl. No. 13/246,554, filed Sep. 27, 2011.
Notice of Allowance dated May 20, 2013, U.S. Appl. No. 13/246,554, filed Sep. 27, 2011.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Restriction Requirement dated Mar. 19, 2015, U.S. Appl. No. 13/463,799, filed May 3, 2012.
Office Action dated Sep. 9, 2015, U.S. Appl. No. 13/463,799, filed May 3, 2012.
Final Office Action dated Mar. 10, 2016, U.S. Appl. No. 13/463,799, filed May 3, 2012.
Restriction Requirement dated Sep. 4, 2015, U.S. Appl. No. 13/455,121, filed Apr. 24, 2012.
First Action Interview Pre-Communication dated Jan. 29, 2016, U.S. Appl. No. 13/455,121, filed Apr. 24, 2012.
Notice of Allowance dated Mar. 11, 2016, U.S. Appl. No. 13/455,121, filed Apr. 24, 2012.
Office Action dated Mar. 13, 2013, U.S. Appl. No. 13/471,107, filed May 14, 2012.
Notice of Allowance dated Aug. 26, 2013, U.S. Appl. No. 13/471,107, filed May 14, 2012.
Office Action dated Aug. 12, 2014, U.S. Appl. No. 13/769,268, filed Feb. 15, 2013.
Final Office Action dated Mar. 17, 2015, U.S. Appl. No. 13/769,268, filed Feb. 15, 2013.
Notice of Allowance dated Jun. 12, 2015, U.S. Appl. No. 13/769,268, filed Feb. 15, 2013.
First Action Interview Pre-Communication dated Dec. 1, 2014, U.S. Appl. No. 13/844,226, filed Mar. 15, 2013.
Notice of Allowance dated Mar. 12, 2015, Application U.S. Appl. No. 13/844,226, filed on Mar. 15, 2013, Idf 8724 A300-27300).
Office Action dated Jul. 14, 2014, U.S. Appl. No. 13/661,536, filed Oct. 26, 2012.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
First Action Interview Pre-Communication dated Jul. 9, 2015, U.S. Appl. No. 14/034,475, filed Sep. 23, 2013.
Final Office Action dated Mar. 8, 2016, U.S. Appl. No. 14/034,475, filed Sep. 23, 2013.
Restriction Requirement dated Feb. 24, 2015, U.S. Appl. No. 14/304,861, filed Jun. 13, 2014.
Office Action dated Jun. 30, 2015, U.S. Appl. No. 14/304,861, filed Jun. 13, 2014.
Notice of Allowance dated Sep. 18, 2015, U.S. Appl. No. 14/304,861, filed Jun. 13, 2014.
Shipley, Trevor D., et al., Patent Application entitled "Mobile Communication System Identity Pairing," filed Aug. 26, 2011, U.S. Appl. No. 13/218,503.
Burcham, Robert H., et al., Patent Application entitled "In-car Head unit Wireless Communication Service Subscription Initialization," filed Apr. 24, 2012, U.S. Appl. No. 13/455,121.
Notice of Allowance dated Jan. 18, 2017, U.S. Appl. No. 14/698,522, filed on Apr. 28, 2015.

* cited by examiner

VEHICLE TELEMATICS UNIT COMMUNICATION AUTHORIZATION AND AUTHENTICATION AND COMMUNICATION SERVICE PROVISIONING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some motor vehicles may comprise an embedded computer system referred to as a head unit or telematics unit (TU). The TU may provide a variety of operational features including providing centralized access to vehicle sensors and electro-mechanical devices via a controller area network (CAN) communication bus. The TUs may be communicatively coupled to a wireless network, and information available to the TU may be accessed remotely via wireless communication link. This capability may be useful in transportation industries for fleet management and maintenance. This capability may make automobile maintenance and troubleshooting easier for car dealerships and/or independent auto repair shops.

Some TUs may provide wireless communication services for drivers and/or passengers of the vehicle, for example data communication links to the Internet to enable access to web applications and/or to surf the web while riding in the vehicle. The TUs may also provide the ability for authorized individuals (e.g., an owner of the vehicle or proxy of the owner of the vehicle) to employ an application executing on a user equipment (UE) or mobile phone to initiate remote vehicle operations via the TU data communication link. For example, an authenticated user may initiate a remote door unlock from a UE that propagates over a communication path from the UE to the TU, and the TU may command a door lock of the vehicle to unlock over a CAN bus of the vehicle.

SUMMARY

In an embodiment, a vehicle telematics unit (TU) is disclosed. The TU comprises a processor, a non-transitory memory, a cellular radio transceiver, and an application stored in the non-transitory memory. When executed by the processor, the application reads a vehicle identification number (VIN) from a controller area network (CAN) bus of a vehicle in which the TU is installed, generates a random number, transmits a first communication authorization request via the cellular radio transceiver, where the first request comprises the VIN read from the CAN bus and the random number, and receives a short message service (SMS) message via the cellular radio transceiver, where the SMS message comprises a number. Based on determining that the number equals the random number, the application further generates a temporary communication session key, transmits a second communication authorization request via the cellular radio transceiver, where the second request comprises the VIN and the temporary communication session key, and receives a message via the cellular radio transceiver, where the message comprises a permanent session key. The application further transmits a communication authentication request via the cellular radio transceiver, where the authentication request comprises the permanent session key, receives an authentication token via the cellular radio transceiver, and connects to a messaging gateway by sending a connection request via the cellular radio transceiver, where the connection request comprises the authentication token where the messaging gateway provides remote vehicle command communication service to a vehicle in which the TU is installed.

In an embodiment, a vehicle telematics unit (TU) is disclosed. The TU comprises a processor, a non-transitory memory, a cellular radio transceiver, and an application stored in the non-transitory memory. When executed by the processor, the application reads a vehicle identification number (VIN) from a controller area network (CAN) bus of a vehicle in which the TU is installed, obtains an authentication token based on the VIN, connects to a messaging gateway by sending a connection request via the cellular radio transceiver, where the connection request comprises the authentication token. The application further receives a message comprising metadata via the cellular radio transceiver, wherein the metadata identifies at least one topic supported by the messaging gateway the TU is to subscribe to, and transmits a subscription request via the cellular radio transceiver to the messaging gateway to subscribe to the at least one topic identified in the metadata. The application further receives information via the cellular radio transceiver from the messaging gateway published to the at least one topic, and configures the TU to provide communication services in accordance with the information published to the at least one topic.

In an embodiment, a computer system is disclosed. The computer system comprises a processor, a non-transitory memory, and an application stored in the non-transitory memory. When executed by the processor, the application determines that a telematics unit (TU) has connected to a messaging gateway, determines communication services to which the TU is entitled, generates metadata based on the communication services to which the TU is entitled, where the metadata comprises instructions to the TU to subscribe to topics supported by the messaging gateway, whereby subscribing to the topics causes information to be published to the TU that the TU uses to configure itself to provide the communication services to which it is entitled, and transmits the metadata to the TU.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
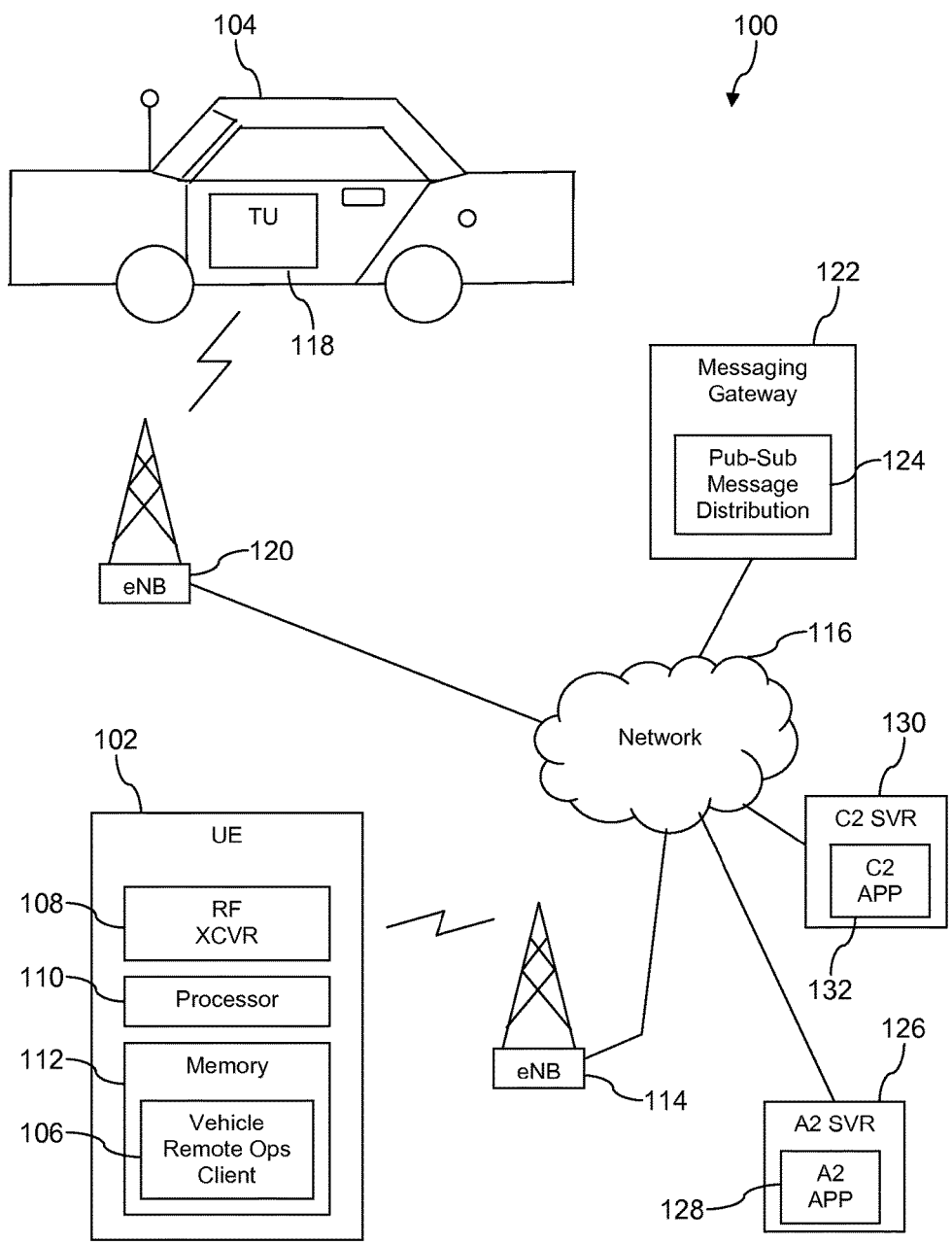
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Motor vehicles may have a telematics unit (TU) or head unit installed. TUs are computers that may execute specialized automotive applications like navigation applications, backup camera imaging applications, entertainment system applications, remote vehicle operation applications, maintenance support applications, and other vehicle applications. The TUs may communicate with sensors and electromechanical items in the vehicle via a controller area network (CAN) bus of the vehicle. TUs may provide access to a variety of wireless communication services. Some of the wireless communication services may be leased or subscription services. For example, the TU may be provisioned to execute ten remote vehicle operation commands over a predefined duration of time, in exchange for a payment from the subscriber and/or vehicle owner.

The disclosure teaches an authentication and authorization process that deters and/or reduces susceptibility to fraud and spoofing by bogus telematics units (e.g., a TU that poses as a different TU to obtain desirable communication services without paying a subscription fee for the services). The disclosure further teaches a system for configuring and updating TU communication services and/or functionality based on "pushing" a metadata file to the TU that identifies topics the TU is to subscribe to via a messaging gateway. The messaging gateway publishes information to those topics to the TU, and the TU uses the information to configure itself to deliver the communication services associated with the topics. Said in other words, the metadata pushed to the TU effectively programs or configures, via the indirection of identifying topics the TU is to subscribe to, the communication services that the TU is authorized to provide to the user and/or driver of the vehicle.

When a communication service changes for the TU— either an additional service is authorized for the TU (e.g., because a user has paid for an additional service) or a service currently provided by the TU is rescinded—the system commands the TU to disconnect and reconnect to the messaging gateway, it builds a new metadata file incorporating the subject change, pushes the metadata file to the TU, and the TU subscribes to topics in accordance with the new metadata file, thereby configuring an additional service or not configuring a former service. The system can support rapid changes to a communication service set that is supported by the TU, which can promote a variety of objectives of wireless communication service providers and vehicle original equipment manufacturers. In an embodiment, the system can support rapid deployment of new functionality by publishing information to a topic subscribed to by the TU that defines application programming interfaces (APIs) in the vehicle accessible via a controller area network (CAN) of the vehicle. This can enable the TU to provide functionality previously unsupported by the TU.

The disclosure teaches an authentication and authorization (A2) process for the TU to connect to a communication hub to receive wireless communication services. The process provides a variety of mechanisms to deter fraud. For example, looking up self-identifying information by reading data stored in the vehicle via the CAN bus such as the vehicle identification number (VIN) rather than storing the VIN in the TU. Thus, if the TU is removed from the vehicle it may not be operable if installed in another vehicle. Providing this looked up information in the authorization request allows the communication hub to determine the continued association of the TU with the appropriate vehicle. When an initial reply containing a temporary communication credential is sent to the TU by the communication hub, it is sent as a short message service (SMS) message to the TU at a telephone number associated with the TU in a data store in the communication hub, which acts as a further deterrence to fraud (i.e., it deters spoofing of a phone number of the TU by another device).

The disclosure further teaches a command and control (C2) process managed by the communication hub that configures the TU to provide the communication and operation functions to which the TU and/or the vehicle is entitled. When the TU connects to the communication hub, a C2 component in the hub sends a message to the TU identifying communication topics the TU should register to subscribe to or to publish to. This registration effectively configures or provisions the TU with the specific communication services to which it is entitled. This information is sent down to the TU in the form of metadata. The TU subscribes with a messaging gateway to the topics identified by the metadata. The messaging gateway publishes information on the topics subscribed to by the TU, and at least some of the information causes the TU to configure or program itself to provide specific communication services and/or other functionality. Some of the services may be preprogrammed into the TU, and the published information may cause the TU to enable the subject service, analogous to turning on a switch. Other services may be programmed in part by the published information. Some of the information included in the metadata, in addition to topics to subscribe and publish to, may comprise commands of how often to publish information to the topics the TU registers to publish to.

When a service manifest for a TU changes, the C2 component may command the TU to disconnect and then reconnect. When the TU disconnects, the previous registrations for topics to publish or subscribe to are discarded. When the TU reconnects, the C2 component sends new metadata to the TU that describes the changed services— either additional services or reduced services—to which the TU is entitled, in the form of commands to register to subscribe to or publish to topics.

The TU may provide an ability to temporarily subscribe to a settings topic, whereby the TU may receive settings published to the TU that the TU can use to configure settings such as seat position settings, mirror position settings, radio selection button settings, vehicle handling mode settings, and the like. The driver may be able to temporarily subscribe to his or her custom settings in a plurality of vehicles having different TUs. For example, the TU may provide a user interface displayed on a touchscreen display unit to select settings to be downloaded. The selection may allow a driver to select a driver 1, a driver 2, a driver 3, etc., whereby settings associated with the identified driver are subscribed to. Alternatively, the selection may allow a driver to select a driver by name.

In an embodiment, the TU or an application that executes on a server such as on an enterprise service bus system may process or transcode a user settings file to adapt the settings to a known geometry of a vehicle in which the TU is installed. For example, the settings values in the settings file may be adapted by the TU or by a centralized computer system for a first use in adjusting mirror positions and seat positions in a large sport utility vehicle (SUV) and adapted again for a second use in a sports car. The process of transcoding user settings may take into account settings limitations in different vehicles. For example, a first vehicle may support 12 FM radio programmed selection buttons while a second vehicle may support only 10 FM radio programmed selection buttons. The transcoding may drop off 2 of the FM radio programmed selection buttons when adapting the settings file to the TU of the second vehicle. The universal settings file that can be adapted to different vehicles, as taught above, may be used when a driver uses an alternative vehicle such as a spouse's vehicle, a friend's vehicle, a rental vehicle, a relative's vehicle, a co-worker's vehicle, and the like.

Turning now to FIG. 1, a system 100 is described. In an embodiment, the system 100 comprises a vehicle 104 having a telematics unit (TU) 118 or head unit installed. The TU 118 may communicate via wireless links to a first enhanced node B (eNB) 120 and to a network 116. The system 100 further comprises a messaging gateway 122 having a publish-subscribe message distribution application 124, an authorization-authentication (A2) server 126 executing an A2 application 128, and a command and control (C2) server 130 executing a C2 application 132. In some contexts the A2 application 128 may be referred to as an A2 application or an A2 component, and the C2 application 132 may be referred to as a C2 application component or a C2 component. The system 100 further comprises a user equipment (UE) 102 that communicates via wireless links to a second eNB 114. The system 100 may comprise any number of vehicles 104, TUs 118, and eNBs 114, 120. The vehicle 104 may be any of an automobile, a mini-van, a van, a sport utility vehicle (SUV), a pickup truck, a delivery truck, a semi-truck, a boat, or another vehicle.

The messaging gateway 122, the C2 server 130, and the A2 server 126 may collectively constitute a communications hub or a part of a communication hub. The communication hub may comprise other applications and/or components not shown in FIG. 1. In an embodiment, two or more of the A2 application 128, the C2 application 132, and the publish-subscribe application 124 may execute on a single server or computer system. For further details about a communication hub that supports communication services for the TU 118, see U.S. patent application Ser. No. 14/698,522, filed Apr. 28, 2015, entitled "Vehicle Remote Operations Control," by Sridhar Reddy Amireddy, et al., which is incorporated herein by reference in its entirety.

The UE 102 may be a smart phone, a media player, a wearable computer, a headset computer, or a wireless enabled portable computer such as a laptop computer, a notebook computer, or a tablet computer. The UE 102 comprises a radio frequency transceiver 108, a processor 110, a memory 112, and a vehicle remote operations command client 106 stored in the memory 112. The TU 118 may register with the publish-subscribe message distribution application 124 to subscribe to receive remote operation commands published by the UE 102 and/or the vehicle remote operations command client 106, for example remote door unlock commands, remote door lock commands, remote engine turn on commands, remote engine turn off commands, remote environmental control commands, remote horns and lights commands, and the like.

When the vehicle 104 is turned off (e.g., the vehicle 104 is parked at a workplace) the TU 118 disconnects from the messaging gateway 122 after a period of time of inactivity. When the vehicle 104 is turned back on or the TU 118 is commanded to wake up by an event manager component (not shown) of the communication hub, the TU 118 performs an authentication process, and, if authentication succeeds, connects to the messaging gateway 122 and/or the publish-subscribe message distribution application 124. In some circumstances (e.g., when a permanent session key provided by the TU 118 during the authentication process expires) an authorization process may be completed before performing the authentication process. For further details about an event manager component, see U.S. patent application Ser. No. 14/703,997, filed May 5, 2015, entitled "Network Event Management Support for Vehicle Wireless Communication," by Sridhar Reddy Amireddy, et al., which is incorporated herein in its entirety.

In the case that the authorization and authentication processes succeed, the TU 118 then connects to the messaging gateway 122 and/or the publish-subscribe message distribution application 124. When connected to the messaging gateway 122, the TU 118 may subscribe to receive notifications from specific topics and to publish notifications to specific topics. For example, the TU 118 may subscribe to receive vehicle remote operation commands published by the UE 102 and/or the vehicle remote operations client 106. When the TU 118 receives a vehicle remote operation command, it may send a command to an appropriate device or controller in the vehicle 104 over a controller area network (CAN) bus of the vehicle 104, for example send an unlock command over the CAN bus to an electro-mechanical door lock system. As another example, the TU 118 may register to publish information to a fuel level topic specific to the vehicle 118 and may periodically publish fuel level information to the messaging gateway 122. The TU 118 may register to publish information to a tire inflation pressure topic, to publish information to a vehicle speed topic, to publish information to a vehicle location topic, and other topics.

Figure 2:
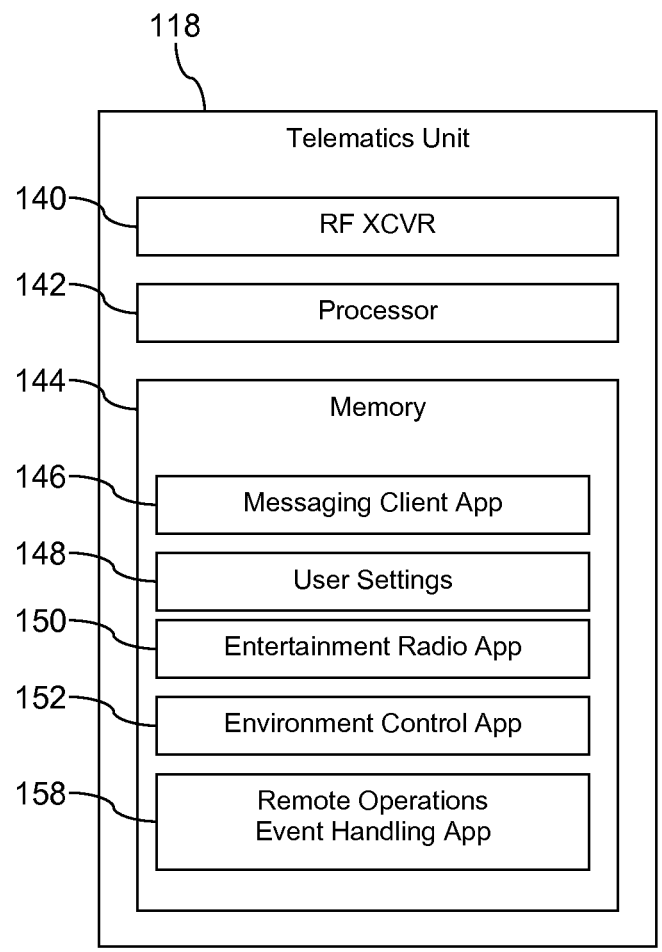
FIG. 2 is a block diagram of a telematics unit (TU) according to an embodiment of the disclosure.

Turning now to FIG. 2, a block diagram of the TU 118 is described. In an embodiment, the TU 118 comprises a cellular radio transceiver 140, a processor 142, and a non-transitory memory 144. The non-transitory memory 144 may store a messaging client application 146, user settings 148, an entertainment application 150, an environment control application 152, and a remote operations event handling application 158. In an embodiment, the user settings 148 may be stored not in the non-transitory memory 144 but rather in a main memory or volatile memory of the TU 118. The non-transitory memory 144 may further store other applications (not shown) such as one or more of a backup camera application, a navigation application, a graphics display application, and other applications. The cellular radio transceiver 140 is configured to wirelessly communicate with the eNB 118 according to one of a long term evolution (LTE), a code division multiple access (CDMA), a global system for mobile communications (GSM), or a worldwide interoperability for microwave access (WiMAX) wireless communication protocol.

The messaging client application 146 may establish a communication connection with the publish-subscribe message distribution application 124 and/or the messaging gateway 122. The messaging client application 146 may register with the publish-subscribe message distribution application 124 to publish to topics and to subscribe to receive messages about or from other topics. The messaging client application 146 may receive published messages on topics to which it has subscribed and may distribute information contained in those messages to applications executing in the TU 118 or to vehicle systems via the CAN bus. The messaging client application 146 may read information from applications executing in the TU 118 or read information from vehicle systems via the CAN bus and publish this information to appropriate topics that it has previously registered to publish to.

When the messaging client application 146 disconnects from the publish-subscribe message distribution application 124 and/or the messaging gateway 122 when the TU 118 goes dormant, the messaging client application 146 deregisters from all topics. During boot of the TU 118, the messaging client application 146, after completing an authentication process, connects to the publish-subscribe message distribution application 124 and/or the messaging gateway 122 (in some circumstances, e.g., when a permanent session key has expired, the TU 118 may complete an authorization process before performing the authentication process). When the TU 118 connects to the messaging gateway 122, the messaging client application 146 may register with the messaging gateway 122 to a baseline topic. The C2 application 132 may determine that the TU 118 and/or the messaging client application 146 has connected to the messaging gateway 122 and/or to the publish-subscribe message distribution application 124 and publish a notification to the baseline topic associated with the specific TU 118 that comprises metadata identifying topics that the TU 118 and/or the messaging client application 146 is to register to publish to and subscribe to. Alternatively, the C2 application 132 may transmit the metadata directly to the TU 118.

In response to receiving the baseline notification comprising the metadata, the messaging client application 146 registers with the messaging gateway 122 and/or the publish-subscribe message distribution application 124 for the topics identified in the metadata. Some of the topics that the messaging client application 146 subscribes to publish information to the messaging client application 146 that causes the messaging client application 146 to configure and/or program the TU 118 to provide communication services and/or other services to a user and/or driver of the vehicle 104. In some cases, the information published to the messaging client application 146 may cause the TU 118 to enable or switch from an inactive to an active state preprogrammed functionality in the TU 118. Other pre-programmed functionality in the TU 118 may remain disabled and dormant, perhaps because a user and/or driver of the vehicle 104 has not enrolled to receive the associated service.

Some published information sent to the messaging client application 146 may inform and/or describe application programming interfaces (APIs) of systems and/or controllers in the vehicle 104, accessible to the TU 118 via the CAN bus. The published information may further enable the TU 118 and/or the messaging client application 146 to invoke and/or to build services not previously installed in the TU 118 based in part on using the APIs described in the published information and based in part on abstractly defined functions which are concretely or specifically defined by the published information. Thus, new functionality can be delivered via the subscription mechanism that was not previously defined or encapsulated concretely in the TU 118.

As an example, a car manufacturer rolls out a brand new model of a high performance sports car, and a new feature available locally in the vehicle is the ability to record a video from the front camera with overlaid contextual information (e.g. speed, engine RPM, g-forces). In an embodiment, the C2 application 132 sends new modules or functionality that enable the use of previously unknown native vehicle APIs to the messaging client application 146. In this embodiment, TUs 118 would have the same base messaging client application 146, and the C2 application 132 may enable the messaging client application 146 to use various authorized API's provided by the firmware in the TU 118 using only some configuration parameters. The C2 application 132 may send metadata information about the new API to the messaging client application 146. The messaging client application 146 could then consume this API metadata and enable a cloud-based feature that allows the user and/or driver to upload their videos via a wireless communication link provided by a cellular radio transceiver in the TU 118 directly from the vehicle 104 to some service. The metadata may contain parameters that describe the nature of the service, the messaging client application's intended role in service enablement, and how to use the new API. This would reduce time to market as it would not require an over-the-air firmware update or new messaging client application 146 download. It would be as simple as writing the metadata for the new API and distributing to authorized vehicles—it wouldn't even be a client code change.

The C2 application 132 may determine what topics to command the TU 118 and/or the messaging client application 146 to register to publish to and to subscribe to based on information about communication services that a user of the vehicle 104 has paid for or enrolled to receive. For example, a service manifest may be provided by a wireless communication service provider that operates the eNBs 114, 120 and the communication hub. The service manifest may identify communication services and service level agreements for those services to which a user and/or TU 118 is entitled. These services may be grades of communication service to extend to the TU 118, for example a transmit bandwidth to be configured into the cellular radio transceiver 140 or a cellular wireless communication technology to be used that is thereby configured into the cellular radio transceiver 140. The services may be a volume of data that may be transferred via the cellular radio transceiver 140 either downloaded to the TU 118 or uploaded from the TU 118.

The services may be a number of vehicle remote operations commands that may be performed. The C2 application 132 may monitor the number of times that the TU 118 executes remote vehicle operation commands and when an allowed number of commands have been executed, may generate and send to the TU 118 a second metadata that suppresses the instruction to the TU 118 to subscribe to the remote operation command. The C2 application 132 may accomplish the revision of the TU 118 services by sending a disconnect command to the TU 118 followed by a connect message to the TU 118, wherein the second metadata is sent to the TU 118 after the TU 118 reconnects to the messaging gateway 122.

The entertainment radio application 150 may be configured to provide AM radio functionality, FM radio functionality, and satellite radio functionality. The entertainment radio application 150 may be communicatively coupled to one or more radio receivers in the vehicle to receive broadcast audio content. In an embodiment, the entertainment radio application 150 may have additional functionality to condition and amplify audio content for playback through speakers. For example, the entertainment radio application 150 may present a control interface on the display that a driver or passenger can use to adjust volume, bass, mid-range, treble, left-right balance, front-rear fade, and other operation parameters of an audio system in the motor vehicle 104. In an embodiment, the entertainment radio application 150 may further support receiving and processing audio input from a compact disc player, from an auxiliary device such as an MP3 player, or from some other audio source. The entertainment radio application 150 may read from the user settings 148 to associate radio pre-select buttons with specific AM radio stations, FM radio stations, or satellite radio stations as defined in the user settings 148.

An environment control application 152 may be configured to control air conditioning and heating systems of the motor vehicle to maintain the interior environment of the motor vehicle 104 at a temperature that is comfortable to the driver and/or passengers. In an embodiment, the environment control application 152 may comprise two or more environment control applications or application frameworks. For example, control of the vehicle heating system may be provided via a first environment control application framework and control of the vehicle air conditioning system may be provided by a second environment control application framework. A windshield defrosting system may be provided by a third environment control application framework, or the defrosting system may be integrated with the vehicle heating system.

The remote operations event handling application 158 may be configured to subscribe to vehicle remote operation events and to process those events. When the remote operations event handling application 158 receives a vehicle remote operation event publication from the publish-subscription distribution application 124 (for example relayed to it by the messaging client application 146), the remote operations event handling application 158 processes the event and/or message. For example, the remote operations event handling application 158 may send a command to an electro-mechanical device in the motor vehicle 104 via the CAN bus.

Figure 3A:
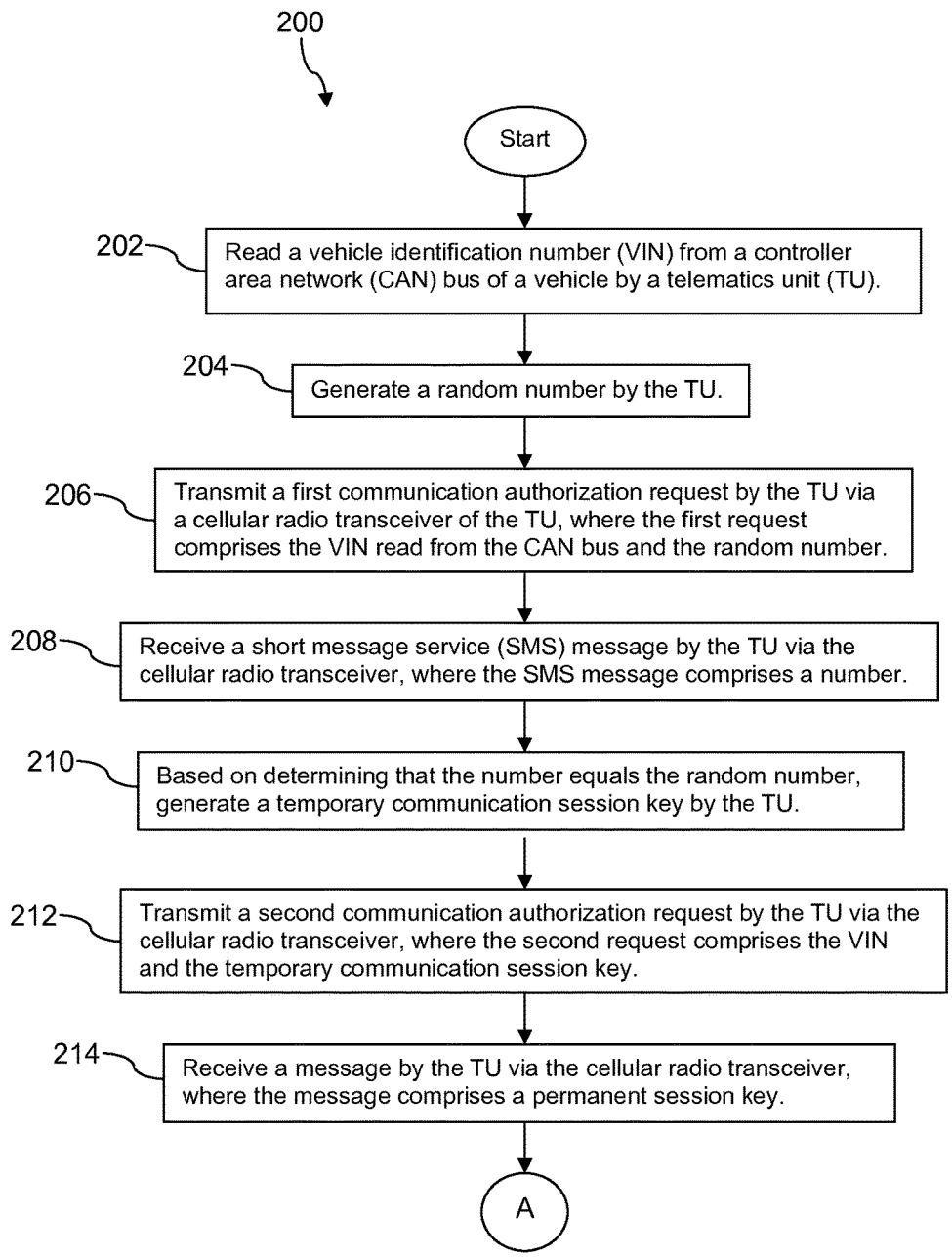
FIG. 3A and FIG. 3B is a flow chart of a method according to an embodiment of the disclosure.
Figure 3B:
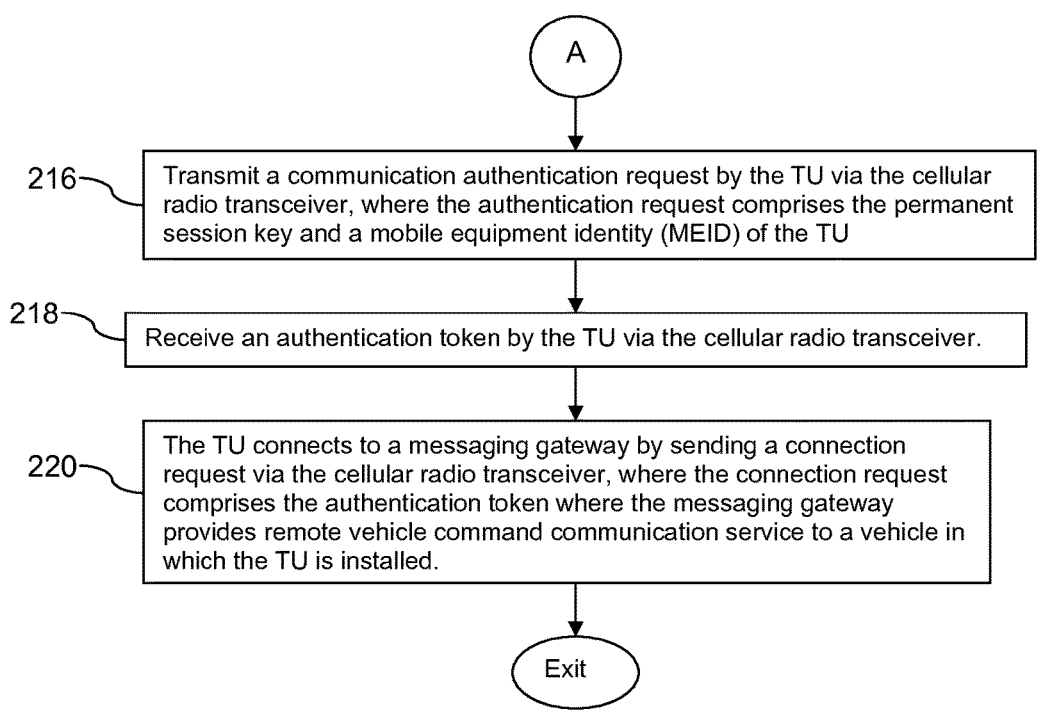

Turning now to FIG. 3A and FIG. 3B, a method 200 is described. The method 200 may be performed, at least in part, by the messaging client application 146 of the TU 118. At block 202, the TU 118 reads a vehicle identification number (VIN) from the CAN bus of the vehicle 104. At block 204, the TU 118 generates a random number or a nonce. In an embodiment, the TU 118 may further generate a client challenge key. At block 206, the TU 118 transmits a first communication authorization request via the cellular radio transceiver 140, where the first request comprises the VIN read from the CAN bus and the random number. In an embodiment the first request may further comprise the client challenge key and identifying information about the TU 118. The TU identifying information may comprise one or more of an electronic serial number (ESN) of the TU 118, a mobile equipment identity (MEID) of the cellular radio transceiver 140, an international mobile station equipment identity (IMEI) of the transceiver 140, a mobile directory number (MDN) or phone number associated with the transceiver 140, a preferred roaming list (PRL) version configured in the transceiver 140, and/or other identifying information. The first request may further comprise a client identity (client ID) associated with the messaging client application 146 and an empty password or a null value in a password field of the first request.

The first communication authorization request may be conveyed to the A2 application 128 for processing. In an embodiment, the A2 application 128 replies to the TU 118 that the request is unauthorized, due to the empty password. The A2 application 128 requests validation that the VIN provided in the first communication authorization request is associated with a vehicle participating in the communication services supported by the communication hub, by attempting to retrieve data associated with the vehicle 104 and/or the TU 118 from a master database of the communication hub. The request for data comprises the VIN sent in the first request by the TU 118. In an embodiment, the request for data further comprises TU identifying information. If an entry for the vehicle 104 and/or the TU 118 are present in the master database, an MDN or telephone number of the TU 118 and/or the cellular radio transceiver 140 is returned to the A2 application 128. The A2 application 128 may store the client challenge key and generate a server challenge key. The A2 application may send a request to an event manager component of the communication hub to send a short message service (SMS) message on behalf of the A2 application 128 to the TU 118, where the SMS message contains the server challenge key and the random number received from the TU 118.

The A2 application 128 requests that the SMS message be sent to the MDN that it looked up in the master database. This operates as a kind of check on the legitimacy of the first communication request, as the A2 application 128 does not rely on an MDN provided in the request itself but looks the MDN up based on the VIN provided. The combination of the messaging client application 146 reading the VIN of the vehicle 104 across the CAN bus every time it sends the first communication authorization request with looking up the MDN based on the VIN by the A2 application 128 and using that MDN to send the SMS makes it difficult to spoof the TU 118 to hijack communication services that are provided for it.

At block 208, the TU 118 receives a short message service (SMS) message via the cellular radio transceiver 140, where the SMS message comprises a number. The TU 118 compares the received number to the random number that it transmitted in the first request. If the received number and the random number do not match, the TU 118 deems the authorization process to have failed. If the received number and the random number do match, at block 210, based on determining that the received number equals the random number, the TU 118 generates a temporary communication session key. In an embodiment, the SMS message further comprises the server challenge key generated by the A2 application 128, and the temporary communication session key may be built by concatenating the client challenge key and the server challenge key.

At block 212, the TU 118 transmits a second communication authorization request via the cellular radio transceiver 140, where the second request comprises the VIN and the temporary communication session key. In an embodiment, the second request further comprises one or more of the client ID and/or TU identifying information. In an embodiment, the second request may be conveyed to the A2 application 128 for processing. The A2 application 128 validates the temporary session key based on the earlier stored client challenge key and server challenge key. If a permanent session key associated with the TU 118 was previously stored, that permanent session key is cleared and/or deleted.

The A2 application 128 may validate the association of the VIN and TU identifying information. If the VIN does not match the TU identifying information, the TU 118 may have been swapped from a first vehicle to a second vehicle. This kind of swapping can be performed, for example, by an automobile dealer while managing his sales inventory. For example, a vehicle that was delivered from the factory with a TU installed may be sold to an individual who doesn't want to pay for this option. The dealer may have removed the TU 118 from the first vehicle and installed it in another vehicle. The A2 application 128 may request a TU swap (e.g., changing the association of the VIN to the TU identifying information provided in the second request). The A2 application 128 creates a permanent session key for the TU 118 and sends the permanent session key to the TU 118.

At block 214, the TU 118 receives a message via the cellular radio transceiver 140 where the message comprises a permanent session key. Blocks 202 through 214 may be considered to constitute, at least in part and from the perspective of the TU 118, an authorization process.

At block 216, the TU 118 transmits a communication authentication request via the cellular radio transceiver 140, where the authentication request comprises the permanent session key and a mobile equipment identity (MEID) of the TU 118 and/or of the cellular radio transceiver 140. Alternatively, the authentication request comprises the VIN looked up via the CAN bus of the vehicle 104. Alternatively, the authentication request comprises a client identity that may be composed of one or more of the VIN, the MEID, the MDN, an electronic serial number, and/or other information about the TU 118. In an embodiment, the authentication request may further comprise one or more of the client ID, a secret key, and TU identifying information. In an embodiment, the authentication request is conveyed to the A2 application 128 for processing. The A2 application 128 validates the permanent session key and then obtains an authentication token. In an embodiment, the authentication may be an OAuth token. The A2 application 128 transmits the authentication token to the TU 118.

At block 218, the TU 118 receives an authentication token via the cellular radio transceiver 140. Blocks 216 and 218 may be considered to constitute, at least in part and from the perspective of the TU 118, as an authentication process.

At block 220, the TU 118 connects to the messaging gateway 122 and/or the publish-subscribe message distribution application 124 by sending a connection request via the cellular radio transceiver 140, where the connection request comprises the authentication token. The messaging gateway 122 and/or the publish-subscribe message distribution application 124 may provide remote vehicle command communication service to the vehicle 104 in which the TU 118 is installed. The messaging gateway 122 and/or the publish-subscribe message distribution application 124 may provide other communication services related to publish and subscribe functions to the TU 118 as described further above.

Figure 4:
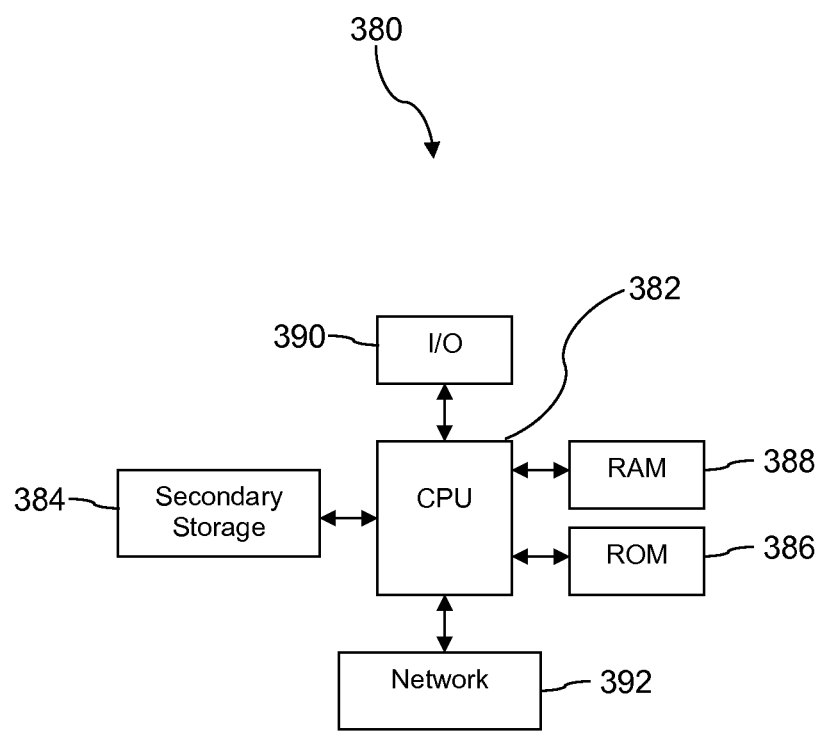
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A vehicle telematics unit (TU), comprising:
    a processor;
    a non-transitory memory;
    a cellular radio transceiver; and
    an application stored in the non-transitory memory that, when executed by the processor;
        reads a vehicle identification number (VIN) from a controller area network (CAN) bus of a vehicle in which the TU is installed,
        obtains an authentication token based on the VIN,
        connects to a messaging gateway by sending a connection request via the cellular radio transceiver, where the connection request comprises the authentication token,
        receives a message comprising metadata via the cellular radio transceiver, wherein the metadata identifies at least one topic supported by the messaging gateway the TU is to subscribe to,
        transmits a subscription request via the cellular radio transceiver to the messaging gateway to subscribe to the at least one topic identified in the metadata,
        receives information via the cellular radio transceiver from the messaging gateway published to the at least one topic, and
        configures the TU to provide communication services in accordance with the information published to the at least one topic.

2. The TU of claim 1, wherein one of the topics subscribed to is a remote vehicle operations command service that supports at least two of a remote door lock and unlock command, a remote engine start and turn off command, a remote environmental control command, a remote horns and lights command.

3. The TU of claim 1, wherein the metadata identifies at least one topic supported by the messaging gateway the TU is to publish to, wherein the application further transmits a publish request via the cellular radio transceiver to the messaging gateway to publish information to the at least one topic identified in the metadata.

4. The TU of claim 3, wherein the metadata identifies a frequency rate at which the TU is to publish to the at least one topic identified in the metadata.

5. The TU of claim 1, wherein the application transmits a subscription request to the messaging gateway to subscribe to a user settings topic, receives a message from the messaging gateway that comprises user settings information, and transmits at least one user setting command over the controller area network (CAN) bus of the vehicle in which the TU is installed, wherein the user settings comprises at least one of a seat position setting, a mirror position setting, a radio station select button setting, an environment control setting, and a vehicle handling mode setting.

6. The TU of claim 5, wherein the TU provides a user interface in the vehicle that receives an input identifying an individual setting topic that is identified in the request sent to the messaging gateway to subscribe to the user settings topic.

7. The TU of claim 1, wherein the application further disconnects from the messaging gateway and, responsive to disconnecting from the messaging gateway, discontinues using communication services identified in the metadata.

* * * * *